Aug. 8, 1967 LE ROY D. YANCEY 3,335,318

SOLID STATE DIMMING CIRCUIT

Filed April 30, 1965

INVENTOR.
LeRoy D. Yancey

BY George C. Power

ATTORNEY

1

3,335,318

SOLID STATE DIMMING CIRCUIT

Le Roy D. Yancey, 1834 S. Oakmont Drive, Bountiful, Utah 84010

Filed Apr. 30, 1965, Ser. No. 452,231

4 Claims. (Cl. 315—194)

This invention relates to transistor type circuits for controlling the firing of solid state controlled devices such as silicon controlled rectifiers, and is directed particularly to circuits for varying the amount of current supplied through silicon controlled rectifiers for illumination of incandescent lamps.

In the variation of the illumination of incandescent lamps, it is desirable to have the illumination increase in a square law relation to the variation of a linearly varied control element. Heretofore circuits for controlling silicon controlled rectifiers have either not produced the desired square law relationship or have been large and expensive devices.

An object of this invention is to provide a circuit utilizing transistors for controlling the amount of current passing through solid state control devices in a manner to produce an illumination change following a square law relationship.

Another object of the invention is to provide a low end voltage or zero set adjustment independent of other circuit adjustments.

Figure 2:
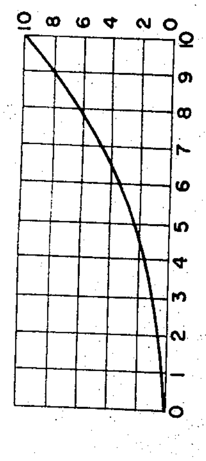
Figure 1:
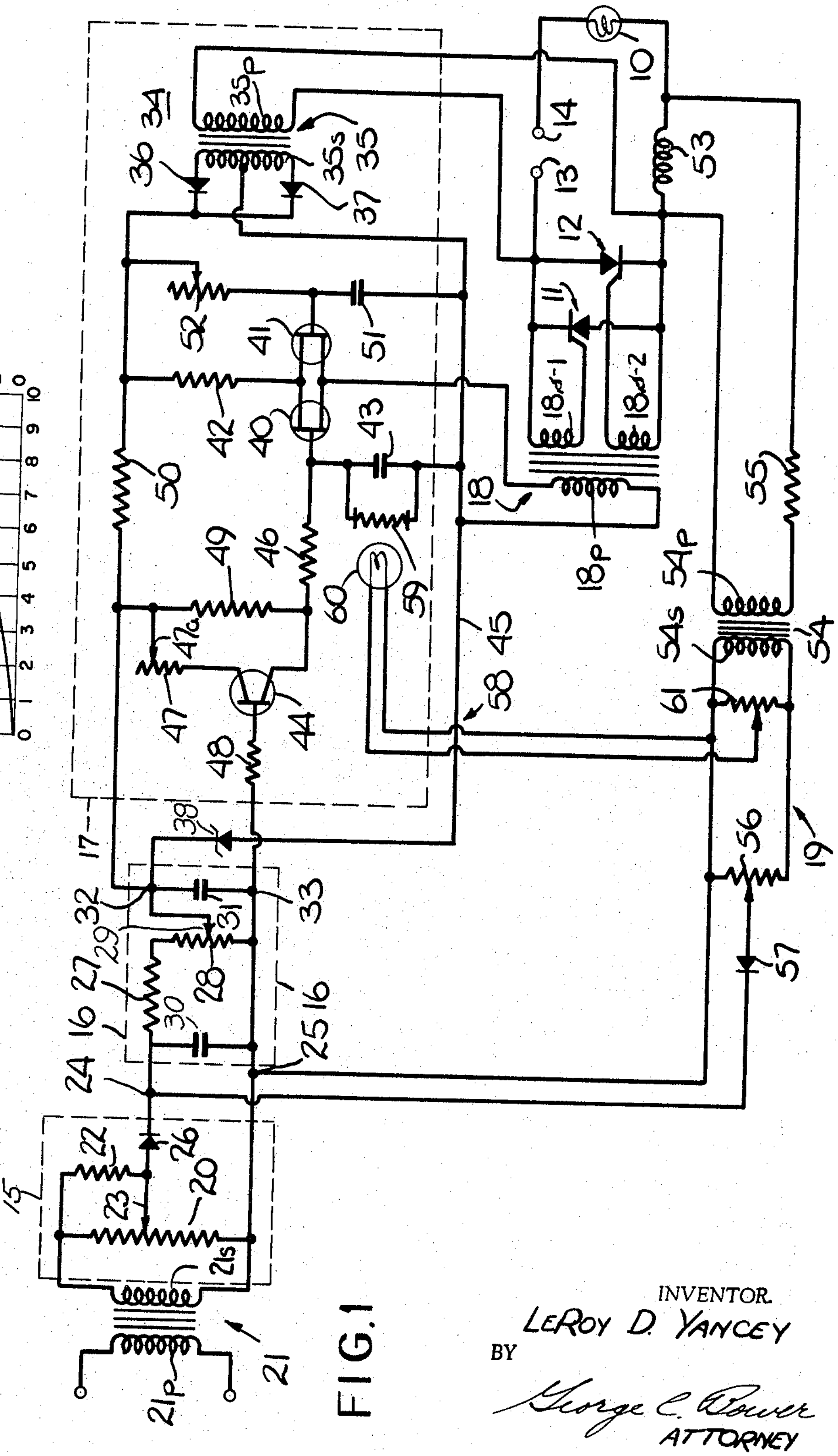

Other and further objects will be apparent from the following description taken in connection with the drawing in which FIG. 1 illustrates an electrical circuit for adjusting the intensity of illumination of incandescent lamps 10 and FIG. 2 is a diagram of the square law relation between the intensity of illumination and the incremental uniform changes in position of the control element.

The load current supplied to the incandescent lamp load 10 is controlled by the silicon controlled rectifiers 11 and 12 connected in a parallel back-to-back relation and in series with the load across the alternating input terminals 13 and 14. The conductivity of the silicon controlled rectifiers is set by the control circuit 15 providing a direct current signal through the filter voltage divider network 16, the transistor firing circuit 17 and firing transformer 18 connected to the silicon controlled rectifiers 11 and 12. A feedback circuit 19 is provided for load voltage regulation.

The control circuit 15 has a control potentiometer 20 connected across the secondary 21*s* of a stepdown input transformer 21. The primary winding 21*p* is connected to an alternating current source to provide a low alternating voltage across the potentiometer 20. A fixed resistor 22 is connected between the movable contact 23 and the high end of the potentiometer 20 so that the voltage across terminals 24 and 25 changes nonlinearly with linear movement or incremental uniform changes in position of the movable contact. A half-wave rectifier 26 is connected in series to rectify the alternating control signal to a pulsating direct current at terminals 24 and 25. Due to the nonlinearity of the control circuit, the change in value of the direct current signal also changes non-linearly particularly at the higher settings of illumination. At the higher illuminations for a given increment of change, the change in the signal is less and less.

The filter network 16 has resistors 27 and 28 connected in series across the terminals 24, 25 forming a voltage divider network with a movable contact 29 engaging the resistor 28 in the lower voltage portion of the network. A condenser 30 is connected in parallel with the network across the resistors 27, 28 and a second condenser 31 is connected between the movable contact 29 and the low

2 end of the network to provide further smoothing action on the direct current signal. Thus across the terminals 32, 33 connected to the input of the transistor firing circuit 17 a non-linear direct current control signal is provided to determine the time of firing of the transistor circuit.

The transistor firing circuit 17 has power supply 34 with an isolation step-down transformer 35. The secondary winding 35*s* has rectifiers 36, 37 connected to provide a pulsating direct voltage to the components of the circuit. The primary winding 35*p* is connected across the silicon controlled rectifiers 11 and 12 to synchronize the pulses with the half cycles passing through a respective rectifier.

In the transistor firing circuit are unijunction transistors 40, 41 connected in parallel to provide alternate firing current paths. A resistor 42 is a current limiting protective resistor for the unijunction transistors. When either transistor is rendered conductive the firing current passes through the resistor 42, either transistor 40 or 41 and the primary winding 18*p*. The sharp rise in current produces pulses in the secondary windings 18*s*–1, 18*s*–2. Depending on the relation of the load voltage, one of the silicon controlled rectifiers is rendered conductive. The transistors 40 and 41 and the elements connected thereto form a first firing means, and the transistor 41 and the resistor 52 and capacitor 51 a second firing means.

The transistor 40 is the main transistor and controls the silicon controlled rectifiers over the entire illuminating range. The transistor 41 is an auxiliary transistor which determines the minimum current through the load and sets the zero point of the control potentiometer.

The conductivity of or initiation current in the unijunction transistor 40 is determined by the condenser 43, transistor 44 and the input signal across the terminals 32, 33. The condenser 43 is connected between the base of the transistor 40 and the line 45 from the power supply 34. The collector of the transistor 44 is connected to the base of the unijunction 40 and the condenser 43 through the upper level limiting resistor 46.

The emitter of the transistor 44 is connected to the terminal 32 through the adjustable resistor 47 and the base of the transistor 44 is connected to the other terminal 33 through the base current limiting resistor 48. This connects the base and emitter across the signal input terminals 32, 33. The resistor 49 is connected in shunt between the movable contact 47*a* of the resistor 47 and the collector of the transistor 44 to provide leakage current. The resistor 49 and the collector 44*c* are connected to the synchronized power supply 34 through the resistor 50. The resistor 47 provides a transistor sensitivity adjustment.

The signal across the terminals 32, 33 controls the condutivity and rate of charging of the condenser 43. The higher the conductivity, the earlier in the synchronized half cycle will the unijunction 40 be rendered conductive and the silicon controlled rectifiers fired. Thus the transistor firing circuit 17 is coupled to the silicon controlled rectifiers 11 and 12 and functions in synchronization with the voltage applied therethrough to fire the silicon controlled rectifiers at any point of the half cycle. The zener diode 38 assists in regulating the synchronizing voltage to enhance the stability of the circuit.

The unijunction 41 connected in parallel to the unijunction 40 is controlled in its conductivity by the condenser 51 and adjustable resistor 52. When the conductivity of the transistor 44 lowers the rate of charge of the condenser 43 below the rate of charge of the condenser 51, the auxiliary unijunction 41 becomes conductive before the unijunction 40. This provides a load current through the lamp load 10 and thereby sets the zero value of the potentiometer 20. The unijunction 41, condenser 51 and resistor 52 provide a zero set for the dimmer.

In series with the silicon controlled rectifiers 11 and 12 an air core or iron core choke 53 is provided to eliminate the sharp rise in current when the rectifiers are rendered conductive and to eliminate radio interference and provide protection against surge currents. The feedback circuit 19 is connected across this choke. The feed back circuit has a step-down isolation choke 54 with the primary winding 54*p* connected across the choke 53 through a voltage dropping resistor 55. A potentiometer 56 is connected across the secondary winding 54*s* to adjust the voltage applied to the terminals 24 and 25. A rectifier 57 is provided to convert the feedback signal into D.C. to correspond with the control signal also applied across the terminals 24 and 25. The feedback circuit provides a positive type of feedback for regulation of the load voltage and maintaining the dimming curve in the proper square law relation for different load conditions.

In addition to the feedback control, a protective feedback circuit 58 is provided comprising a photoresistor 59 connected in parallel with the condenser 43 and a lamp 60 connected across the secondary winding 54*s* by means of the potentiometer 61. Under normal conditions the photoresistor 59 has a high resistance so as not to affect the charging gof the condenser 43. However, on surge currents passing through choke 53, sufficient voltage is created to illuminate the lamp 60 which decreases the resistance of the photoresistor 59 thereby lengthening the time condenser 43 charges and delays the conductivity of the unijunction 40 to late in the half cycle of the voltage applied to the rectifiers. On clearance of the surge conditions, the circuits return to their usual functions.

From the foregoing description it is seen that the apparatus has an input control circuit that varies in a nonlinear manner to provide a signal applied to the transistor of the resistor capacitor network to obtain the desired conduction angle of the solid state controlled devices through the discharge of the unijunction transistor to give a square law change in light output with a linear movement of the control potentiometer. This is accomplished by the apparatus while at the same time providing a zero set circuit which provides for a minimum amount of current through the lamp load.

Various modifications may be made in the circuitry as set forth in the description without departing from the invention as set forth in the appended claims.

I claim:

1. Apparatus for varying an alternating load current supplied to incandescent lamps comprising solid state controlled means for passing load current, a first firing means having an output connected to said solid state controlled means to impress initiating pulses on said solid state controlled means for rendering said solid state controlled means conductive, a control means including a movable control element and being connected to provide to said first firing means a signal creating in said output of said first firing means initiating pulses variable over a half cycle of load current to adjust the illumination of incandescent lamps in a square law relation to incremental uniform changes in position of said movable control element, a second firing means connected in parallel with said first firing means to impress at low load currents initiataing pulses on said same solid state controlled means and in lieu of initiating pulses of said first firing means for limiting to a minimum value load current at the low load current end of the square law relation.

2. Apparatus as set forth in claim 1 wherein said first and second firing circuits have first and second unijunction transistors respectively connected in parallel, with said second unijunction transistor passing initiating pulses in lieu of initiating pulses of said first firing means at low load current values.

3. Apparatus as set forth in claim 2 wherein said first firing means has a variable resistor capacitor circuit connected to said first unijunction transistor for varying the phase of the initating pulses in relation to the load current.

4. Apparatus as set forth in claim 3 wherein said control means has an input control circuit including said movable element for producing a control signal varying nonlinearly in relation to the incremental uniform changes in position of said control element.

References Cited

UNITED STATES PATENTS

| | | | |
|---|---|---|---|
| 3,192,466 | 6/1965 | Sylvan et al. | 307—88.5 |
| 3,243,653 | 3/1966 | Locklin | 315—100 |
| 3,244,964 | 4/1966 | Greening et al. | 307—88.5 |
| 3,249,805 | 5/1966 | McCabe | 307—88.5 |

JOHN W. HUCKERT, *Primary Examiner.*

J. D. CRAIG, *Assistant Examiner.*